(12) United States Patent
Clemen et al.

(10) Patent No.: US 12,055,294 B2
(45) Date of Patent: Aug. 6, 2024

(54) NOZZLE DEVICE FOR FEEDING FUEL INTO A COMBUSTION CHAMBER OF A GAS TURBINE ASSEMBLY, AND GAS TURBINE ASSEMBLY

(71) Applicant: Rolls-Royce Deutschland Ltd & Co KG, Blankenfelde-Mahlow (DE)

(72) Inventors: Carsten Clemen, Mittenwalde (DE); Gregor Christoffer Gebel, Ludwigsfelde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/353,487

(22) Filed: Jul. 17, 2023

(65) Prior Publication Data

US 2024/0027067 A1 Jan. 25, 2024

(30) Foreign Application Priority Data

Jul. 21, 2022 (DE) ..................... 10 2022 207 490.4

(51) Int. Cl.
*F23R 3/28* (2006.01)
*F02C 7/22* (2006.01)
*F23D 17/00* (2006.01)

(52) U.S. Cl.
CPC .............. *F23R 3/28* (2013.01); *F02C 7/222* (2013.01); *F23D 17/002* (2013.01); *F23R 3/283* (2013.01)

(58) Field of Classification Search
CPC .......... F02C 7/222; F23D 17/002; F23R 3/28; F23R 3/283
See application file for complete search history.

(56) References Cited

U.S. PATENT DOCUMENTS

| 9,970,356 B2* | 5/2018 | Okazaki | F23R 3/30 |
| 2015/0082770 A1* | 3/2015 | Igarashi | F23R 3/34 60/737 |
| 2021/0180518 A1* | 6/2021 | Koganezawa | F23R 3/16 |

FOREIGN PATENT DOCUMENTS

| DE | 102018204741 A1 | 10/2019 |
| DE | 102020212410 A1 | 4/2021 |

(Continued)

OTHER PUBLICATIONS

German Search Report dated Mar. 23, 2023 from counterpart German Patent Application No. 10 2022 207 490.4.

*Primary Examiner* — Kyle Robert Thomas
(74) *Attorney, Agent, or Firm* — SHUTTLEWORTH & INGERSOLL, PLC; Timothy J. Klima

(57) ABSTRACT

A nozzle device for feeding fuel into a combustion chamber of a gas turbine assembly, includes: a nozzle main body having nozzle openings for injecting the fuel into the combustion chamber; a nozzle bracket having a fuel line for fluidic connection between a manifold fuel line and the main body, wherein at least a portion of the fuel line is aligned along, a central longitudinal axis; and a throttle element disposed downstream of the manifold fuel line for throttling the fuel flow to a pre-specified target quantity. The throttle element includes two stages which are fluidically disposed in series, each stage having a line portion aligned along a central longitudinal axis and a flow cross section. A relaxation chamber is disposed between the stages, the flow cross section of the relaxation chamber being larger than the flow cross section of the upstream stage.

20 Claims, 8 Drawing Sheets

(56) References Cited

FOREIGN PATENT DOCUMENTS

DE   102020215597 A1   6/2021
EP       0071420 A1   2/1983

* cited by examiner (State of the Art)

NOZZLE DEVICE FOR FEEDING FUEL INTO A COMBUSTION CHAMBER OF A GAS TURBINE ASSEMBLY, AND GAS TURBINE ASSEMBLY

This application claims priority to German Patent Application 10 2022 207 490.4 filed Jul. 21, 2022, the entirety of which is incorporated by reference herein.

The invention relates to a nozzle device for feeding fuel into a combustion chamber of a gas turbine assembly according to the present disclosure. The invention furthermore relates to a gas turbine assembly, in particular an engine of an aircraft.

A nozzle device of the type mentioned at the outset, having a nozzle main body for injecting the fuel into the combustion chamber and a nozzle bracket having at least one fuel line for the fluidic connection between a manifold fuel line of a fuel manifold and the nozzle body is derived from EP 0 071 420 A1, for example.

It is assumed to be known (without documentary evidence) that a nozzle device of the type mentioned at the outset for throttling the fuel flow (volumetric flow) to a pre-specified target quantity can have a throttle element for feeding into the combustion chamber via the nozzle main body, which throttle element is disposed downstream of the manifold fuel line, in particular on the upstream (entry-proximal) end of the fuel line.

In the case of fuels of low density, this relating in particular to gaseous fuels such as methane and/or hydrogen, high velocities of several hundred meters per second can arise when throttling the fuel while adjusting the necessary drop in pressure by way of the nozzle device, for example by means of the throttle element. This causes disadvantages in the operation of the nozzle device, for example a reduced dwell time of the fuel within the combustion chamber and/or insufficient mixing associated with an unfavourable temperature profile at the combustion chamber exit, or the turbine entry, respectively.

The present invention is based on the object of providing a nozzle device and a gas turbine assembly for an optimized operation using gaseous fuels.

In terms of the nozzle device, the object is achieved by features as disclosed herein. Advantageous variants of design embodiments are set forth herein.

In terms of the gas turbine assembly, the object is achieved by features as disclosed herein.

For achieving the object in terms of the nozzle device it is proposed that the throttle element comprises at least two stages which are fluidically disposed in stages, wherein each stage has at least one line portion (in particular of the fuel line) which is aligned along a central longitudinal axis and has a flow cross section which is in each case configured so as to be, for example, circular with a diameter (or elliptic or polygonal), and wherein a relaxation chamber is in each case optionally disposed between the stages, the flow cross section of said relaxation chamber being larger than the flow cross section of the stage disposed (directly, without any further intervening stage) upstream of the latter.

In this way, the throttle element comprises n stages Sx, where n is at least two, wherein the individual stages $Sx=1 \ldots n$ are fluidically disposed in series. The first stage here is disposed farthest upstream, while the nth stage is farthest downstream, and the other stages are correspondingly sequenced therebetween.

The line portions of the respective stages are configured so as to be, for example, cylindrical and/or rotationally symmetrical in relation to their respective central longitudinal axes, and/or have shapes which are optimized in terms of the disposal relative to the other line portions. Existing edges can be configured so as to be radiused with a view to a streamlined design.

For example, each stage has exactly one line portion.

The axial extent of the line portions and/or of the relaxation chambers for a compact construction mode is preferably as small as possible, but in the case of the line portions in the manner of an aperture sufficiently large to achieve the desired effect in terms of a pressure loss and/or relaxation. For example, the axial extent of the respective line portions can be at least substantially of the same size. The axial extent can be less than a diameter Ds of the fuel line downstream of the throttle element, e.g. less than half the diameter Ds.

The line portions of the respective stages have, for example, a circular flow cross section, or a flow cross section of another, e.g. elliptic or polygonal, shape which is constant over the axial extent. In the case of a circular flow cross section also of the other lines (manifold fuel line, portion of the fuel line downstream of the throttle element), the following relative correlations between the flow cross sections stated hereunder also apply to the diameters of the lines, as the flow cross sections are solely a function of the diameters.

The fuel line downstream of the throttle element, for example at least directly downstream of the throttle element, and/or largely over the axial extent of said fuel line, has a constant flow cross section having the diameter Ds.

As a result of the proposed configuration of the throttle element, the required throttling of the fuel flow to the pre-specified target quantity can also be performed with fuel of low density, in particular hydrogen, at comparatively low flow rates. Highly increased flow rates and disadvantages associated therewith can be avoided as a result, and an optimized operation of the nozzle device and/or of the gas turbine assembly is made possible also when using, for example, hydrogen or hydrogen-containing fuels.

An effective throttle action can be achieved when at least one, preferably all, of the line portions within the throttle element (i.e. the individual stages) has/have a smaller flow cross section (having diameters $Do1 \ldots Don$) than the manifold fuel line (having the diameter Dm) and/or the fuel line (directly) downstream of the throttle element (having the diameter Ds). The flow cross section of the manifold fuel line is preferably larger than the flow cross section of the fuel line downstream of the throttle element.

Fluidically favourable throttling can be effected when the first stage, disposed farthest upstream, has the largest flow cross section, in particular the largest diameter, of the available stages.

In this context it is particularly advantageous in fluidic terms when the stages fluidically disposed (directly, without any intervening further stage) downstream of a stage have in each case the same or a smaller flow cross section, in particular diameter, as or than the respective stage disposed (directly) upstream. It can in particular apply to $n \geq 2$: $Dm > Ds > Do1 \geq \ldots \geq Don$, e.g. $Dm > Ds > Do1 \geq Do2 \geq Do3$ (for $n=3$) or $Dm > Ds > Do1 \geq Do2$ (for $n=2$).

In one preferred variant of configuration, the line portions are disposed so as to be at least in part mutually coaxial and/or coaxial with the central longitudinal axis. Here, the central longitudinal axes of the line portions and/or the central longitudinal axis of the fuel line disposed downstream of the throttle element lie on top of one another.

For a favourable throttle effect it can be advantageous when the line portion of at least one of the stages by way of its central longitudinal axis is disposed so as to be radially offset from the central longitudinal axis of at least one other stage and/or from the central longitudinal axis of the fuel line downstream of the throttle element, wherein the central longitudinal axes run so as to be mutually parallel, for example. The relaxation chambers are for example in each case in particular disposed so as to be coaxial with the central longitudinal axis.

The offset of at least two line portions, preferably of two (directly) successive stages, in the radial and/or revolving direction can be dissimilarly configured. For example, two (or more) successive stages can (in each case in an alternating manner) be disposed so as to be mutually offset between 90° and 270°, e.g. by substantially 180°, in the revolving direction. The alternating offset of the line portions thus obtained advantageously contributes towards increasing the pressure loss.

The offset can advantageously be configured in such a manner that the flow cross sections of the line portions of at least two successive stages in terms of the radial position thereof and/or the position thereof in the revolving direction, have a small overlap, e.g. of at most 20% of the (optionally smaller) flow cross section, or no overlap, i.e. the flow cross sections have at least largely dissimilar radial positions and/or positions in the revolving direction. When viewed in the axial direction, any geometric overlap of successive flow cross sections is thus avoided or at least minimized. It can be prevented in this way that individual current threads shoot axially through the throttle element and thus diminish the throttle effect. It can be particularly expedient when the individual flow cross sections are configured with a shape different from a circular or polygonal shape, having a shape, e.g. semi-circular, elliptic or crescent-shaped, which is optimized for an offset arrangement of this type relative to the other line portions. The shapes of the flow cross sections of the successive stages here can be congruent, for example, or have in each case another shape, e.g. crescent-shaped and circular combined, favourable for this configuration. The central longitudinal axes of the line portions run in each case in particular through the centres of area of the respective flow cross sections.

A favourable throttle effect can furthermore be achieved in that the line portion of at least one stage by way of its central longitudinal axis is disposed so as to be inclined at an angle in relation to the central longitudinal axis of the line portion of another stage and/or to the central longitudinal axis of the fuel line downstream of the throttle element. The angle can be constant (resulting in a constant gradient) or configured so as to be variable (resulting in a curvature). The angle is preferably 45° or less, e.g. 30° or less.

A plurality of line portions disposed in (particularly direct) succession of a plurality of stages by way of their central longitudinal axes can expediently be disposed so as to be inclined at the angle in relation to the central longitudinal axis of the fuel line downstream of the throttle element, wherein the respective inclines, in particular the orientation of the latter in terms of the revolving direction, alternate. For example, the inclines can have the same, in particular constant, angle and/or the central longitudinal axes of successive stages can point in another directions in terms of the revolving direction, e.g. be mutually offset by between 90° and 270°, e.g. by substantially 180°.

In a variant of configuration that is advantageous in terms of production technology, the throttle element comprises an in particular cylindrical, e.g. monolithic, hollow body, or is configured as such, which hollow body is fastened to or in the nozzle bracket while being sealed in a fluid-tight manner. The hollow body here preferably comprises at least part of a fastening means and/or of a fastening structure, e.g. a thread for a screw connection. In this way, the throttle element can advantageously be manufactured independently of the nozzle device, in particular the nozzle bracket, and be subsequently assembled. A monolithic hollow body which comprises the entire throttle element can in particular be manufactured by means of an additive manufacturing method (3D-printing).

In a variant of configuration that is advantageous in terms of manufacturing and assembling, the throttle element comprises at least two individual elements or is formed therefrom, wherein one individual element includes in each case in particular at least the line portion of a stage. The individual elements preferably comprise line portions and/or relaxation chambers that are assigned in such a manner that conventional manufacturing of the throttle element, or of the individual elements, can take place without an additive manufacturing method, e.g. by means of a subtractive manufacturing method such as turning and/or boring, respectively. During installation, the individual elements are preferably sealed in a fluid-tight manner in relation to one another and/or in relation to the remaining nozzle device. This variant of configuration also offers advantages in terms of interchangeability, e.g. when setting up the throttle element on a test bed, whereby the individual elements can be interchanged individually if required.

In one variant of configuration, in the presence of a plurality of relaxation chambers the flow cross sections thereof, in particular the diameters thereof, can be of identical (and congruent) configuration.

In particular in this context, the flow cross sections, in particular the diameters, of the relaxation chambers (in terms of shape and/or size) can correspond to the flow cross section, in particular the diameter, of the fuel line disposed downstream of the throttle element.

The invention will be explained in more detail hereunder by means of exemplary embodiments with reference to the drawings, in which.

Figure 1:
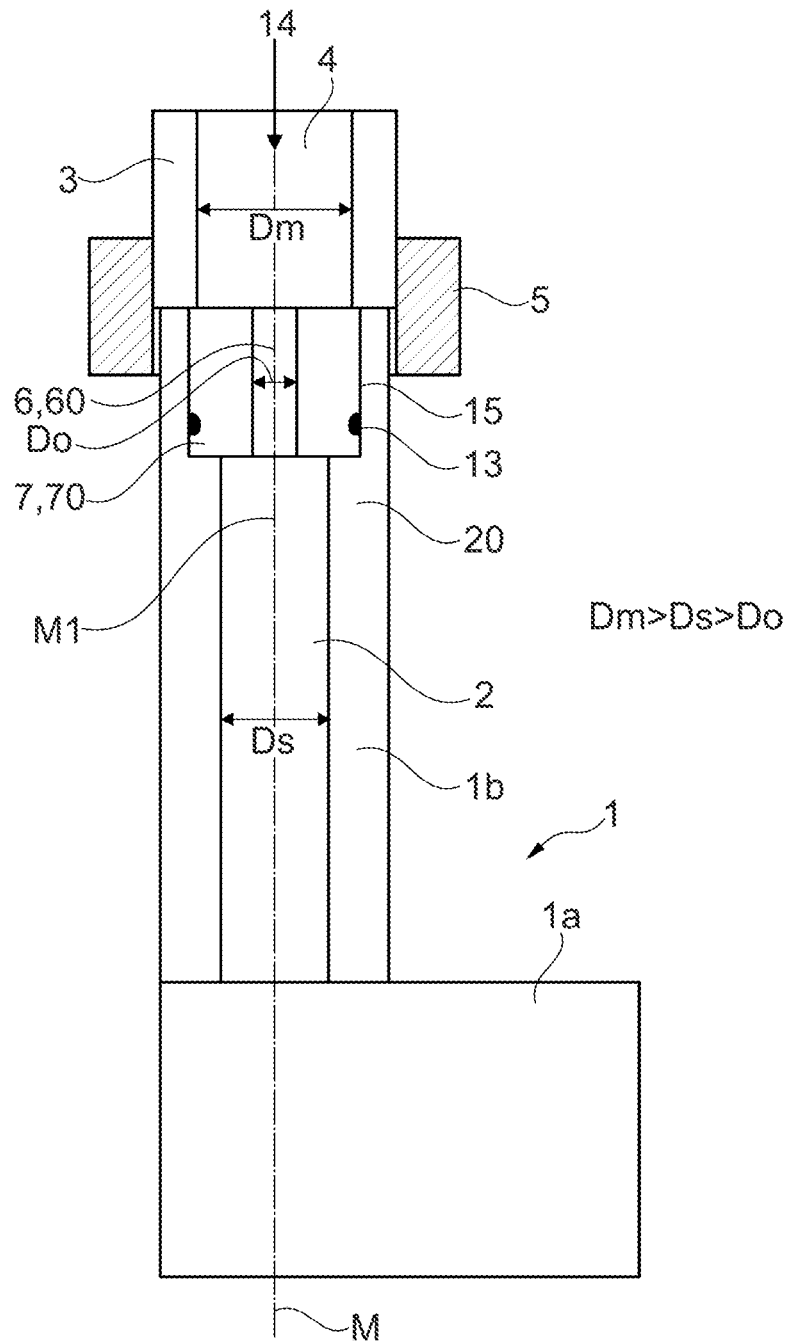
FIG. 1 shows a nozzle device having a throttle element for throttling a fuel flow to a pre-specified target quantity according to the invention, in a schematic longitudinal sectional illustration.

FIG. 1 in a schematic longitudinal sectional illustration shows a nozzle device 1 for feeding fuel 14 into a combustion chamber of a gas turbine assembly, in particular of the engine of an aircraft. The nozzle device 1 has a nozzle main body 1a which is indicated in FIG. 1 and by way of which fuel 14 is injected into the combustion chamber by means of nozzle openings (not shown in FIG. 1) during operation.

The nozzle device 1 shown in FIG. 1 is in particular configured for feeding liquid fuels, e.g. kerosene.

The nozzle device 1 furthermore has a nozzle bracket 1b, here by way of example having one fuel line 2. In the installed state the fuel line 2 forms a fluidic connection between a port 4 of a fuel manifold, having a fuel supply line 3, and the nozzle main body 1a. The fuel line 2, at least in portions, is aligned along a central longitudinal axis M, wherein the central longitudinal axis M forms the axis of symmetry. The fuel line 2, at least in a portion disposed downstream of a throttle element 7, has in particular a circular flow cross section having a diameter Ds which is delimited by a wall 20 of the fuel line 2.

FIG. 1 shows the port 4 having the fuel supply line 3. The fuel line 3, at least directly upstream of the fuel line 2, has in particular a circular flow cross section having a diameter Dm, wherein the flow cross section of the fuel supply line 3 is larger than the flow cross section of the fuel line 2. In the case of the preferably circular configuration of the flow cross section, the following thus applies: Dm>Ds.

The fuel supply line 3 and the nozzle bracket 1b are connected to one another in a fluid-tight manner by a connection assembly 5. The connection assembly 5 can be configured, for example, as a screw connection having a nut and a corresponding thread.

The throttle element 7 is disposed on the upstream (entry-proximal) end of the fuel line 2, which throttle element 7 during operation throttles the fuel flow (volumetric flow) flowing from the fuel supply line 3 into the nozzle device 1 to a pre-specified target quantity required for operating the combustion chamber.

By way of example, the throttle element 7 here is configured as a cylindrical hollow body 70 which is inserted, in particular in a form-fitting manner, into a corresponding cylindrical recess 15 in the wall 20. Another configuration, e.g. a disposal between the port 4 and the nozzle bracket 1b, would also be possible.

By way of example, an encircling annular seal 13 is present as a sealing means for sealing in a fluid-tight manner on the external side of the annular body 70. The upstream end of the hollow body 70 terminates so as to be substantially flush with the face of the upstream end of the wall 20. A wall of the fuel supply line 3 radially overlaps the hollow body 70 for axial fixing.

The hollow body 70 comprises a line portion 6 of the fuel line 2 which is disposed within the throttle element 7 and which is in particular formed by a central, longitudinally aligned bore 60 running in the longitudinal direction through the hollow body 70. The bore 6 by way of a central longitudinal axis M1 is disposed so as to be coaxial with the portion of the fuel line 2 disposed downstream of the throttle element 7, wherein the central longitudinal axis M1 lies on the central axis M.

The line portion 6 of the throttle element 7 has a flow cross section that is smaller than the portion of the fuel line 2 disposed downstream of the throttle element 7. The flow cross section is preferably configured so as to be circular and has a diameter Do. In the case of the preferably circular configuration also of the other flow cross sections, Dm>Ds>Do thus applies. This reflects in an exemplary manner the correlation between the diameters of the flow cross sections. In the case of a non-circular configuration of the flow cross sections, the relative correlations of the respective portions apply generally to the respective flow cross sections (also in terms of the exemplary embodiments according to FIGS. 2 to 8).

During operation, fuel 14 flows into the nozzle device 1 by way of the port 4. In the process, the fuel flow first passes the throttle element 7 in which, owing to the reduction of the flow cross section, a pressure drop resulting in a flow resistance is generated in such a manner that the target quantity of fuel 14 is supplied to the nozzle main body 1a through the fuel line 2.

In the case of fuels of low density (gaseous fuels such as methane and/or hydrogen), disadvantageously high velocities of several hundred metres per second can arise for adjusting the required pressure drop.

In order for this to be avoided, a nozzle device 1 having a modified throttle element 7 is proposed for fuels of low density, in particular hydrogen. A variant of embodiment of the modified throttle element 7 is shown in FIG. 2.

Figure 2:
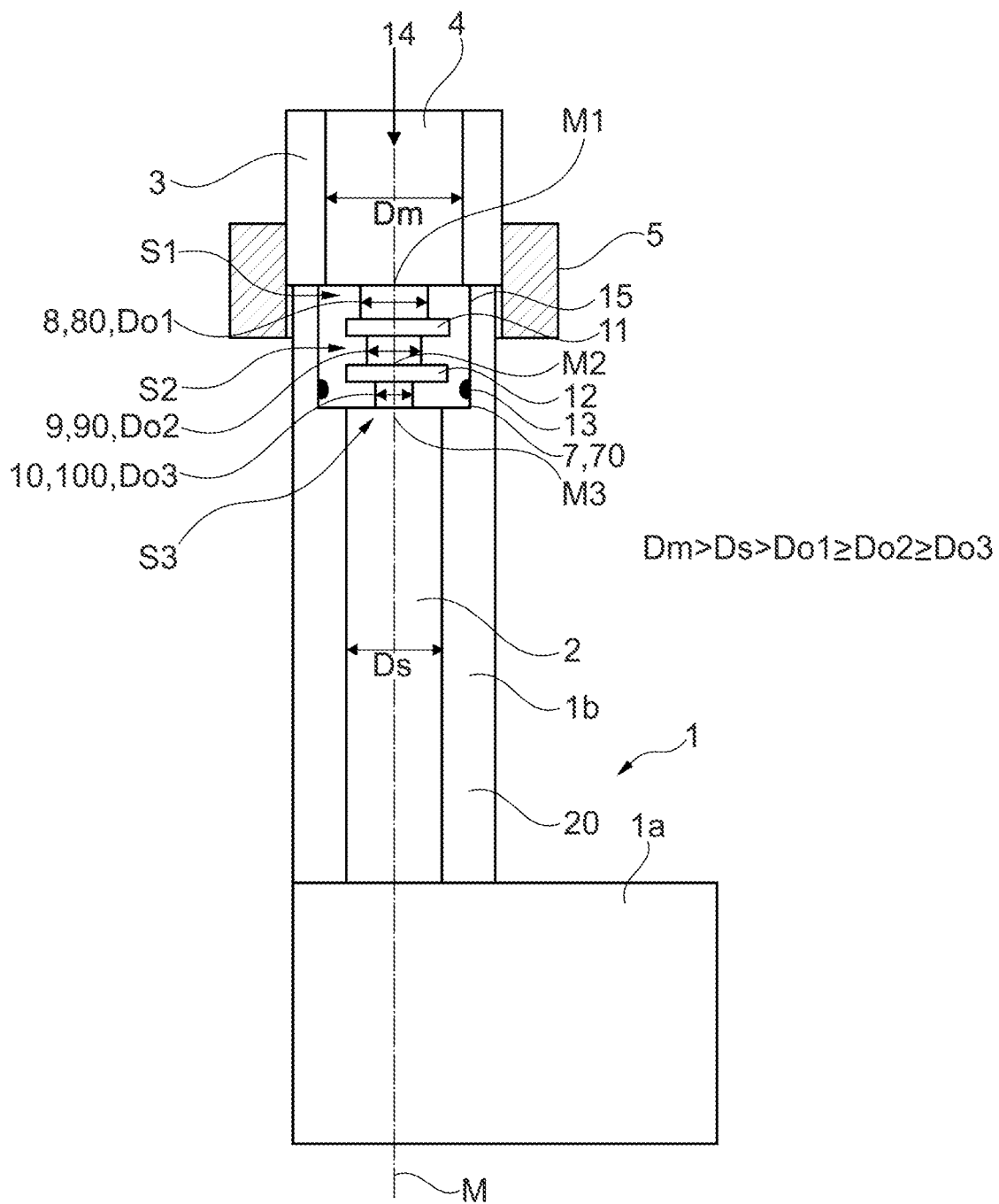
FIG. 2 shows a proposed nozzle device having the throttle element comprising three stages which in the flow direction have a successively smaller diameter, in a schematic longitudinal sectional illustration.

The throttle element 7 shown in FIG. 2 has at least two, by way of example in FIG. 2 three, stages S1, S2, S3 which are fluidically disposed in series. Each stage S1, S2, S3 has a line portion 8, 9, 10 of the fuel line 2 which is disposed along a respective central longitudinal axis M1, M2, M3 and has a respective, in particular constant, flow cross section. For example, the line portions 8, 9, 10 are in each case formed by an in particular cylindrical bore 80, 90, 100. The flow cross sections are in each case preferably configured so as to be circular, having diameters Do1, Do2, Do3.

A relaxation chamber 11 is disposed between the first stage S1 and the second stage S2, the latter being (directly, without any intervening further stage) successive in the flow direction. A relaxation chamber 12 is disposed between the second stage S2 and the third stage S3, the latter being (directly, without any intervening further stage) successive in the flow direction. The relaxation chambers 11, 12 each have a larger flow cross section than the respective stage S1, S2 disposed directly upstream. By way of example, the flow cross sections of the relaxation chamber 11, 12 correspond to one another and/or at least substantially to the flow cross section of the portion of the fuel line 2 downstream of the throttle element 7, wherein the diameter of said flow cross sections approximately equals the diameter Ds.

The axial extent of the relaxation chambers 11, 12 by way of example here is smaller than the axial extent of the line portions 8, 9, 10 in such a manner that a relaxation effect is achieved, the latter however being ideally minor with a view to an ideally compact configuration of the throttle element 7.

The axial extent of the line portions 8, 9, 10 of the individual stages S1, S2, S3 by way of example here is of at least substantially identical configuration. For example, the axial extent is less than the diameter Ds, in particular less than half the diameter Ds.

The throttle element 7 which comprises the stages S1, S2, S3 and the relaxation chambers 11, 12, by way of example in FIG. 2 is integrally manufactured, i.e. is monolithic. The production can take place, for example, by means of an additive manufacturing method (3D-printing).

By way of example, the line portions 8, 9, 10 in FIG. 2 are disposed so as to be coaxial with the portion of the fuel line 2 downstream of the throttle element 7, whereby the respective central longitudinal axis M1, M2, M3 of said line portions 8, 9, 10 lies on the central longitudinal axis M.

By way of example, the respective stage S2, S3 disposed downstream in FIG. 2 have a smaller flow cross section than the respective stages S1, S2 disposed directly upstream of the former. Due to the staged arrangement within the throttle element 7, this results in the flow cross section within the fuel line 2 being decreased in steps. In particular, the first stage S1, disposed farthest upstream, has the largest flow cross section having the largest diameter Do1. The subsequent, second stage S2 has a smaller flow cross section having the smaller diameter Do2. The subsequent, third stage S3 has the smallest flow cross section having the smallest diameter Do3. In summary, in the variant of configuration of the nozzle device 1 shown in FIG. 2, this results in a relative mutual correlation of the diameters of the individual lines according to the rule Dm>Ds>Do1>Do2>Do3. In general, with n stages, it applies to ≥2: Dm>Ds>Do1> . . . >Don.

Figure 3:
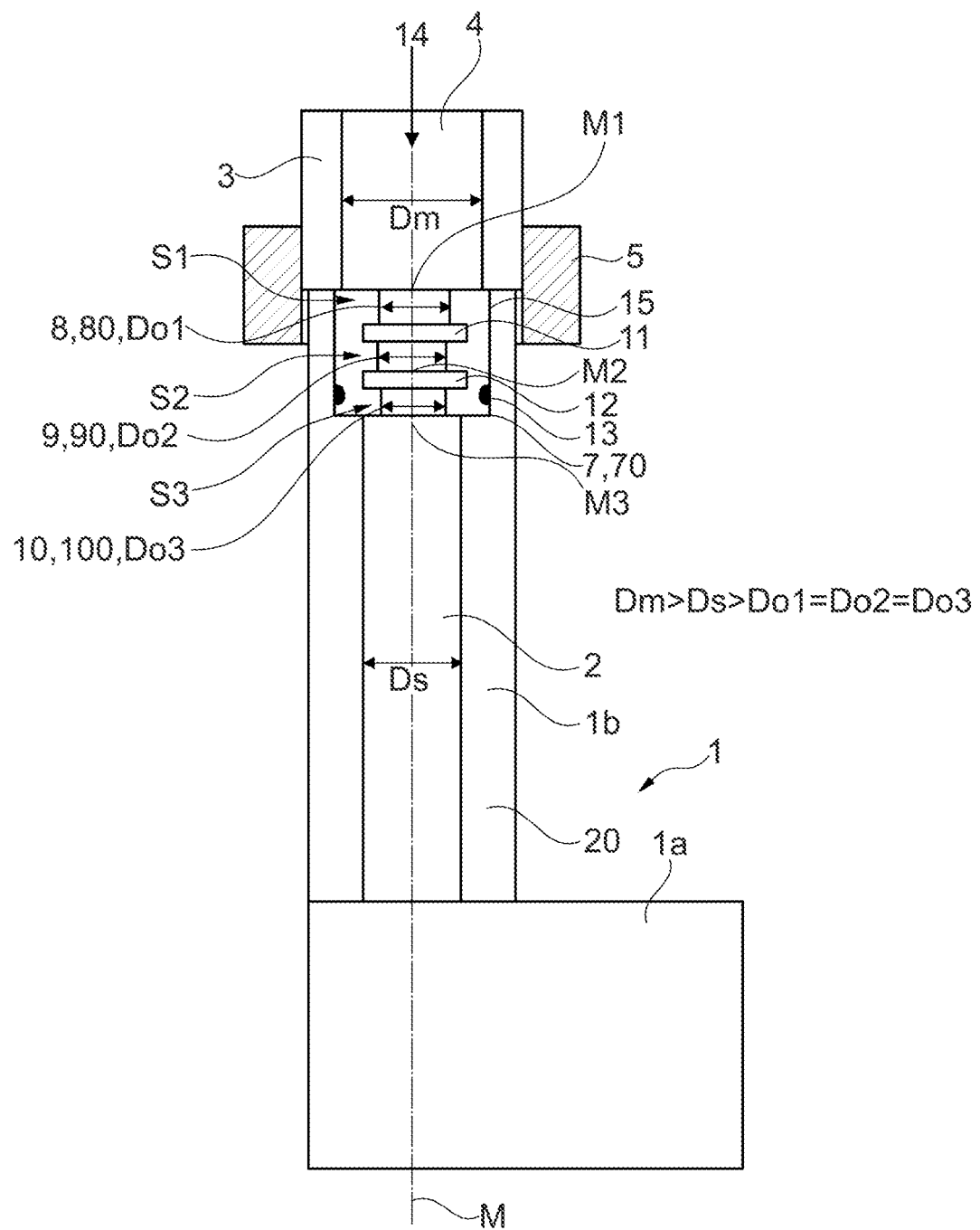
FIG. 3 shows a further variant of configuration of the proposed nozzle device having the throttle element comprising three stages of identical diameter, in a schematic longitudinal sectional illustration.

FIG. 3 shows a further variant of configuration of the nozzle device 1 having a throttle element 7 comprising three stages S1, S2, S3, In comparison to the variant of configuration shown in FIG. 2, the throttle device 7 according to FIG. 3 differs in that all stages S1, S2, S3 have the same flow cross section, in particular the same diameter Do1, Do2, Do3. Here too, relaxation chambers 11, 12 are disposed between the stages S1, S2, and S2, S3.

In summary, in the variant of configuration of the nozzle device 1 shown in FIG. 3, this results in a relative mutual correlation of the diameters of the individual lines of Dm>Ds>Do1=Do2=Do3. In general, with n stages, it applies to n≥2: Dm>Ds>Do1= . . . =Don.

Figure 4:
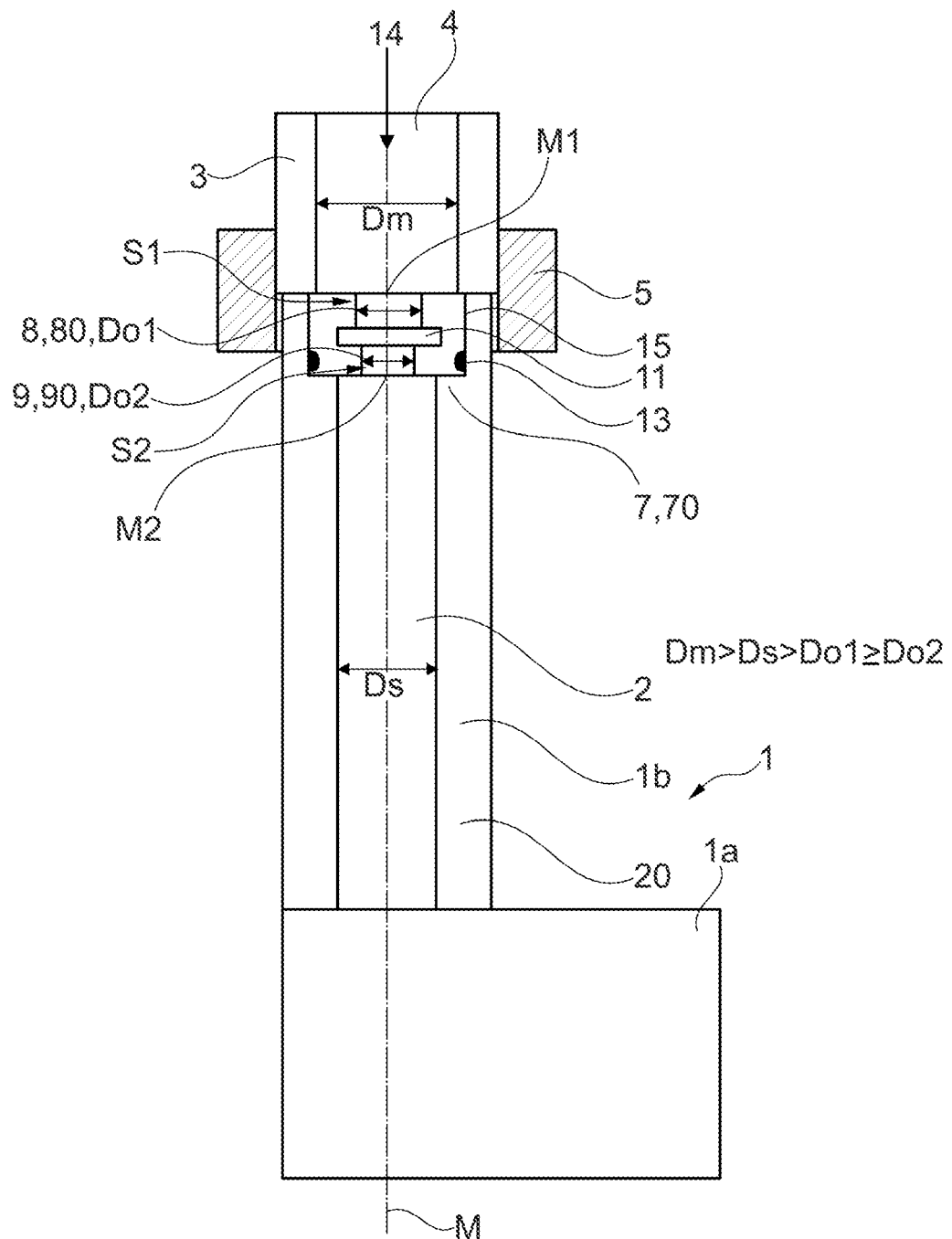
FIG. 4 shows a further variant of configuration of the proposed nozzle device having the throttle element comprising two stages which in the flow direction have a successively smaller diameter, in a schematic longitudinal sectional illustration.

FIG. 4 shows a further variant of configuration of the nozzle device 1 having a throttle element 7, here by way of example comprising two stages S1, S2. The relaxation chamber 11 is disposed between the two stages S1, S2. In terms of the remaining configuration (disposal of the line portions 8, 9; axial extent of the line portions 8, 9 and of the relaxation chamber 11), with the exception of the 2-staged configuration, FIG. 4 corresponds to the variant of configuration shown in FIG. 2, whereby the flow cross section of the first stage S1 is smaller than the flow cross section of the second stage S2, thus: Dm>Ds>Do1>Do2. In the 2-staged configuration, a configuration of the stages S1, S2 according to the rule Dm>Ds>Do1=Do2 would also be possible.

Figure 5:
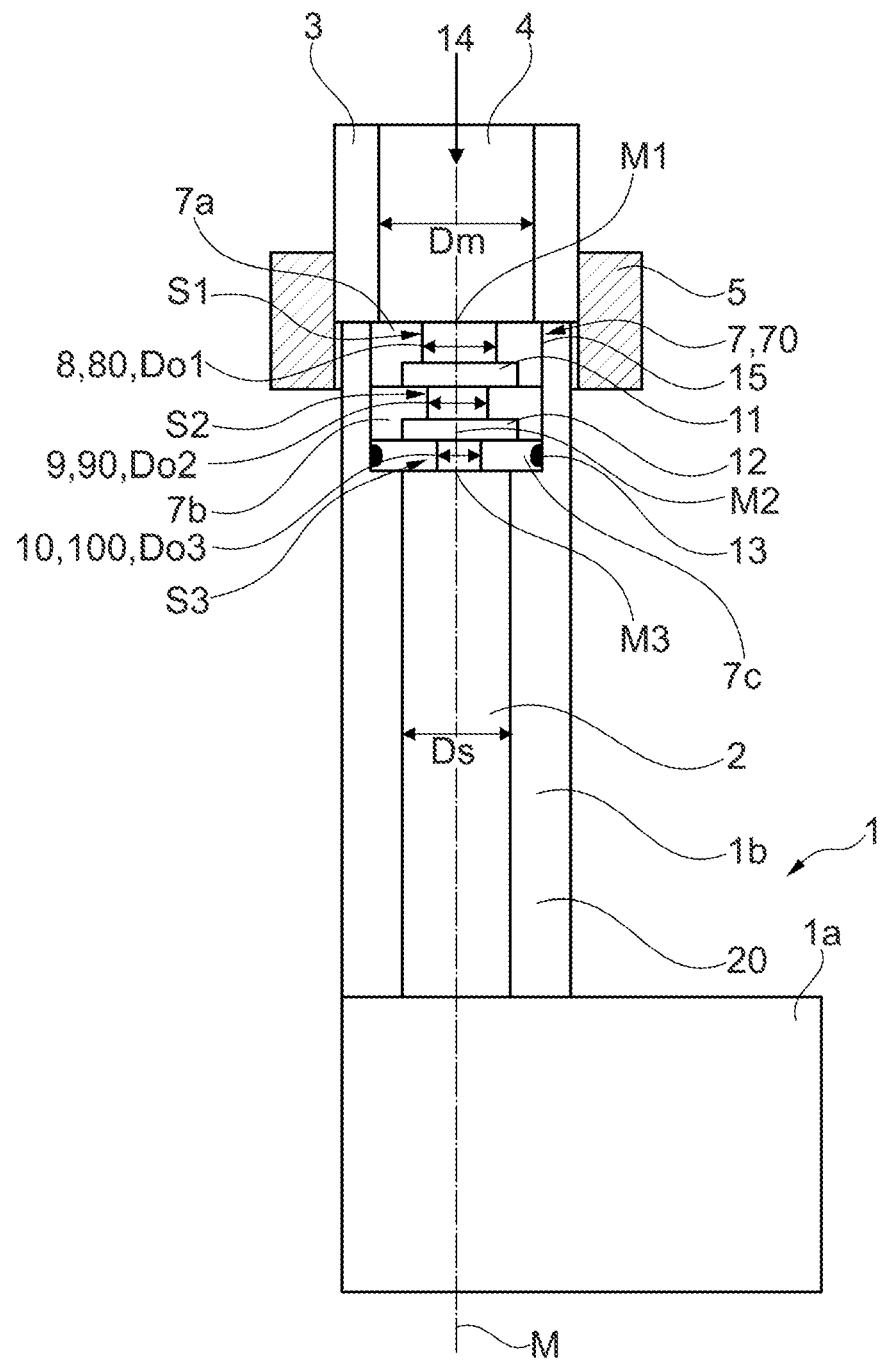
FIG. 5 shows a further variant of configuration of the proposed nozzle device having the throttle element comprising three individual elements and three stages in a schematic longitudinal sectional illustration.

FIG. 5 shows a variant of configuration of the nozzle device 1 having a throttle element 7 which in terms of the configuration and disposal of the line portions 8, 9, 10 and of the relaxation chambers 11, 12 in an exemplary manner corresponds to the variant of configuration shown in FIG. 2. In particular, the diameters of the individual lines are laid out according to the rule Dm>Ds>Do1>Do2>Do3.

As opposed to the variant of configuration shown in FIG. 2, the throttle element 7 has a plurality of individual elements 7a, 7b, 7c, or is presently formed by the individual elements 7a, 7b, 7c, respectively. The individual elements 7a, 7b, 7c are in each case formed from cylindrical hollow bodies which, when assembled, form the hollow body 70. Each individual element 7a, 7b, 7c preferably has the line portion 8, 9, 10 of a stage S1, S2, S3. By way of example, the relaxation chamber 11 is assigned to the individual element 7a having the stage S1. By way of example, the relaxation chamber 12 is assigned to the individual element 7b having the stage S2. A configuration of this type of the throttle element 7 has the particular effect of advantages in the production and/or the installation of the throttle element 7, and/or permits simple modification of the throttle element 7, for example when setting up the nozzle device 1, or the throttle element 7, in the operation on a test bed, respectively.

Figure 6:
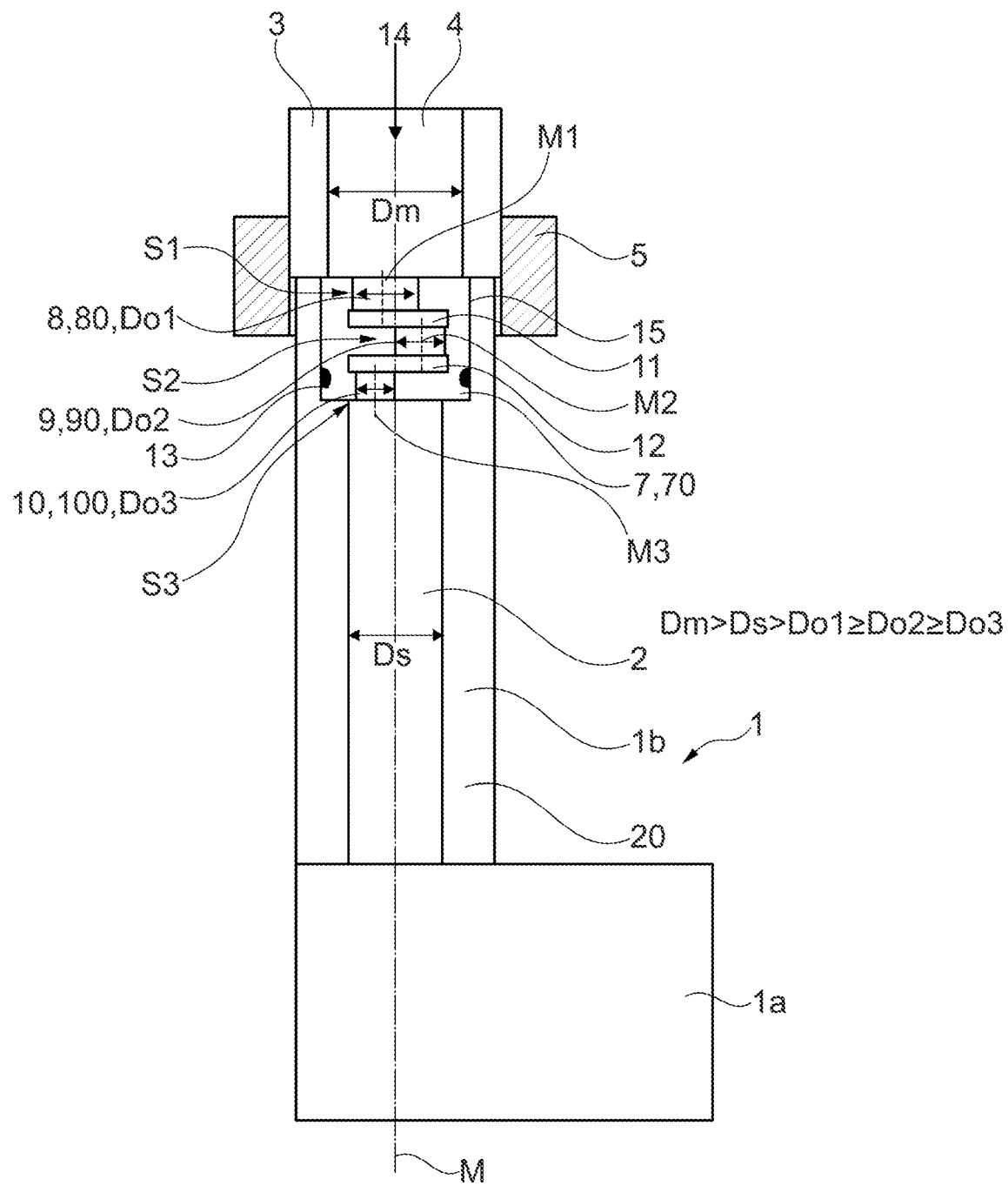
FIG. 6 shows a further variant of configuration of the proposed nozzle device having the throttle element comprising three stages with radially offset line portions, in a schematic longitudinal sectional illustration.

FIG. 6 shows a further variant of configuration of the nozzle device 1 having a throttle element 7 comprising by way of example three stages S1, S2, S3. In a manner similar to the exemplary embodiment according to FIG. 2, the stages S1, S2, S3 in terms of their flow cross sections are conceived in an exemplary manner according to the rule Dm>Ds>Do1>Do2>Do3.

As opposed to the exemplary embodiment shown in FIG. 2, the line portions 8, 9, 10 by way of their respective central longitudinal axes M1, M2, M3 are disposed so as to be radially offset from the central longitudinal axis M in FIG. 6. The offset of the central longitudinal axes M1, M2, M3 is in each case different for the (directly) successive stages S1, S2, S3, in the present case by way of example so as to be offset in each case in an alternating manner towards the two radially opposite sides of the central longitudinal axis M (e.g. by approximately 180° in the revolving direction). The relaxation chambers 11, 12 are in particular disposed so as to be coaxial with the central longitudinal axis M.

Figure 7:
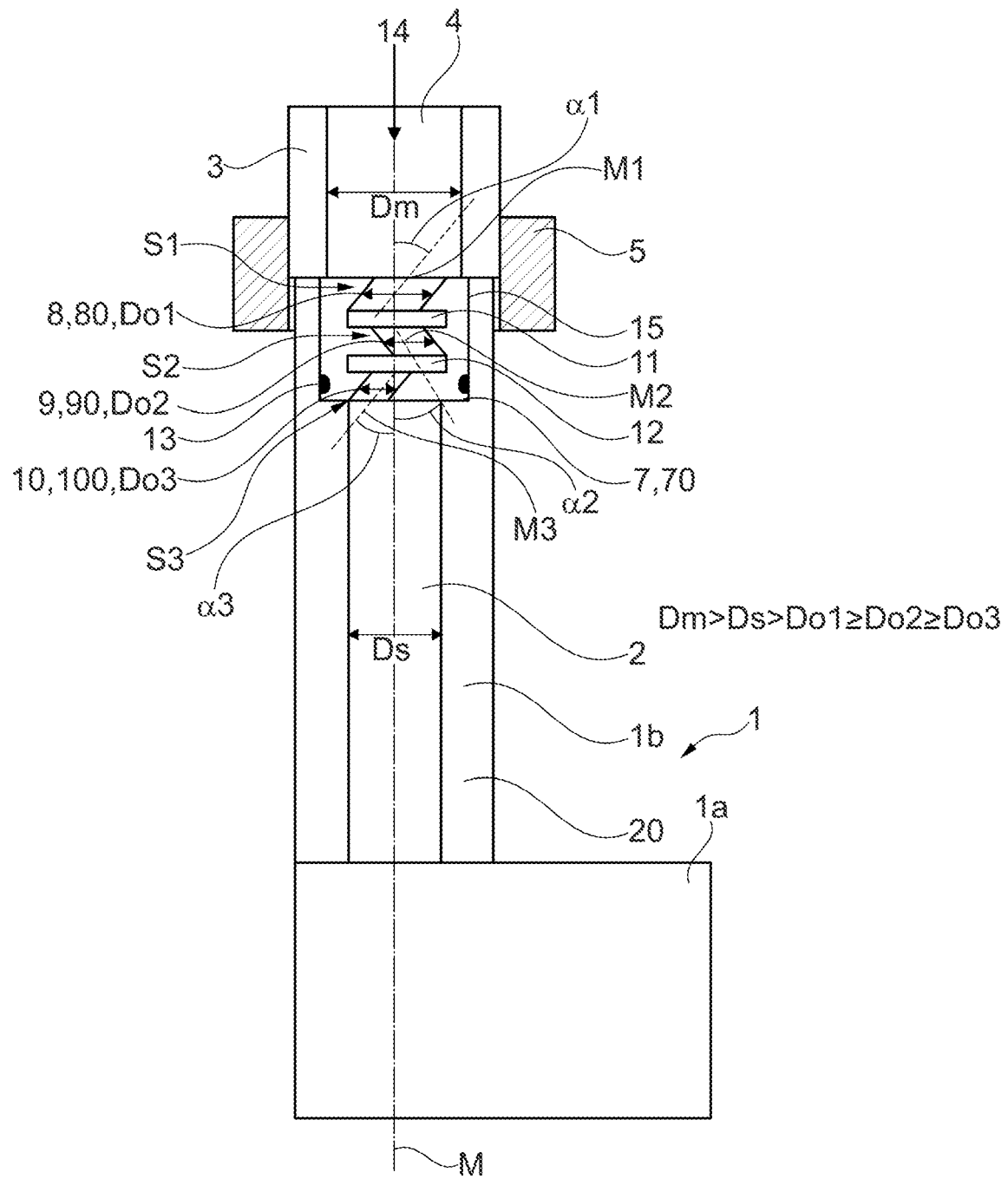
FIG. 7 shows a further variant of configuration of the proposed nozzle device having the throttle element comprising three stages with inclined line portions, in a schematic longitudinal sectional illustration.

FIG. 7 shows a further variant of configuration of the nozzle device 1 having a throttle element 7 comprising by way of example three stages S1, S2, S3, In a manner similar to the exemplary embodiment according to FIG. 2, the stages S1, S2, S3 in terms of their flow cross sections are conceived in an exemplary manner according to the rule Dm>Ds>Do1>Do2>Do3.

As opposed to the exemplary embodiment shown in FIG. 2, the line portions 8, 9, by way of their respective central longitudinal axes M1, M2, M3 are disposed so as to be inclined at an angle α1, α2, α3 in relation to the central longitudinal axis M, said angle α1, α2, α3 by way of example being constant. The inclines are in each case preferably less than 45°, e.g. less than 30°, in relation to the central longitudinal axis M. The inclines of the central longitudinal axes M1, M2, M3 in terms of their orientations in relation to the revolving direction alternate in each case for the (directly) successive stages S1, S2, S3. By way of example, the central longitudinal axes M1, M2, M3 presently lie in a common plane, but on opposite sides are inclined or aligned, i.e. with an offset of 180° in the revolving direction, relative to the central longitudinal axis M. By way of example, the angles α1, α2, α3 have the same value.

Figure 8A:
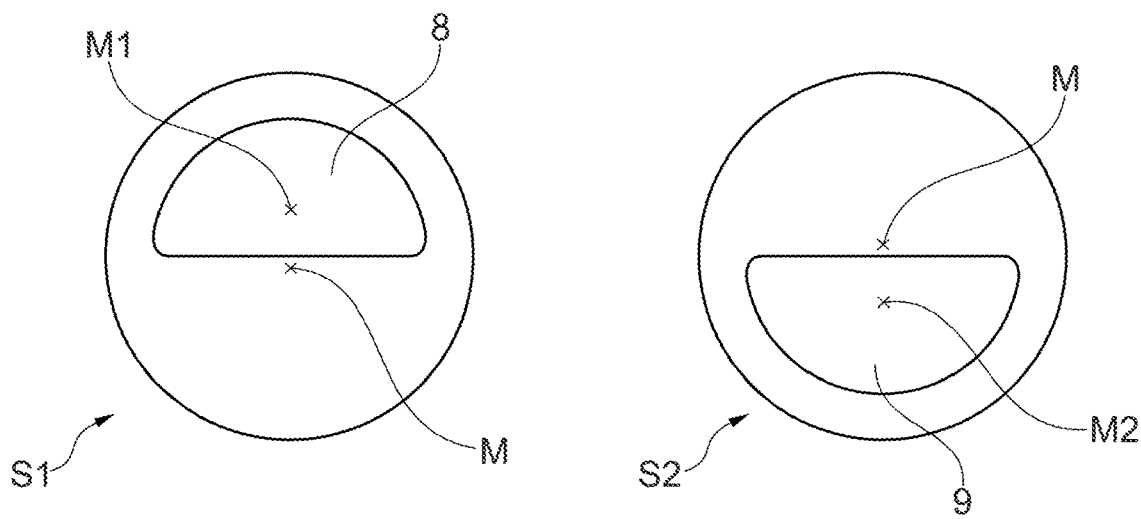
FIGS. 8A, B, C each show exemplary shapes of flow cross sections of two in particular successive line portions, in a schematic illustration viewed from above.
Figure 8B:
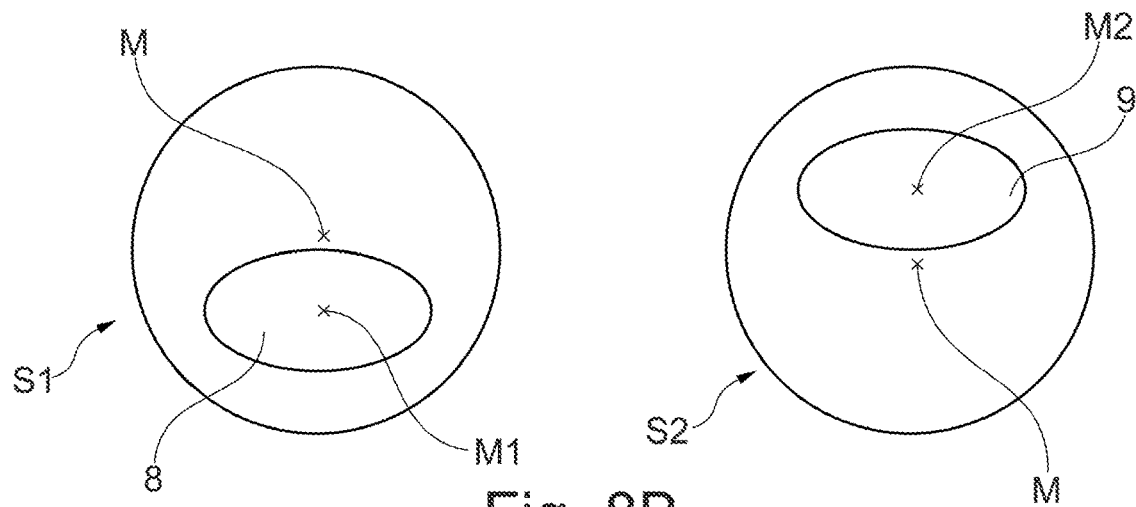
Figure 8C:
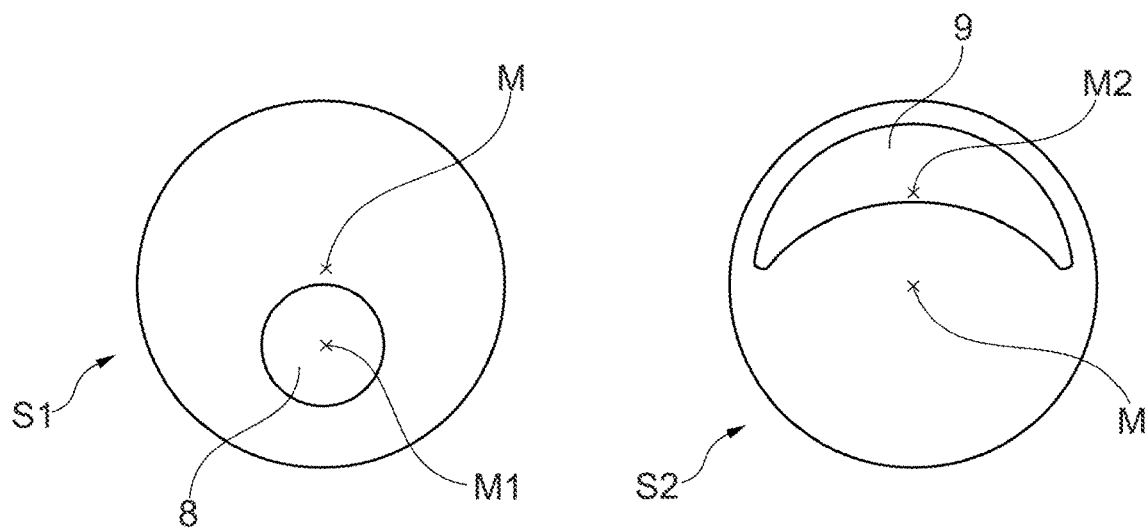

FIG. 8A, FIG. 8B and FIG. 8C in addition to FIG. 6 show in each case in a plan view from above of the line portions 8, 9 of the respective stage S1, S2 exemplary shapes and arrangements which may have offset flow cross sections of two, in particular successive, line portions 8, 9. The offset here is in each case configured in such a manner that the flow cross sections of the line portions 8, 9 of the two successive stages S1, S2 in terms of their radial position and/or position in the revolving direction, here by way of example, do not overlap, i.e. the flow cross sections in sequence in the axial direction have different radial positions and positions in the revolving direction. When viewed in the axial direction, any geometric overlap of successive flow cross sections is thus avoided. This prevents that individual current threads shoot axially through the throttle element 7 without being deflected and thus diminish the throttle effect.

By way of example, the flow cross sections in FIG. 8A are configured so as to be semi-circular and mutually congruent. By way of example, the flow cross sections in FIG. 8B are configured so as to be elliptic and mutually congruent. By way of example, the flow cross sections in FIG. 8C are configured so as to be different, whereby one flow cross section is embodied so as to be circular, and one flow cross section is embodied so as to be crescent-shaped.

The individual features of the exemplary embodiments according to FIG. 2 to FIG. 8 can of course be combined with one another in various ways.

In summary, as a result of the configuration and/or disposal of the stages S1, S2 and optionally S3, in particular of the line portions 8, 9 and optionally 10 in the exemplary embodiments of the throttle element 7 shown in FIG. 2 to FIG. 7, an increased pressure drop per length unit of the throttle element 7 can be achieved without reducing the diameter of the line portions 8, 9 and optionally 10 in such a manner that excessively high velocities arise in the use of gaseous fuels, in particular hydrogen. The flow pattern in particular within the throttle device 7 can be influenced by the different variants of configuration of the nozzle device 1, in particular of the throttle element 7. In this way, a gas turbine assembly can be optimized, in particular with a view to the operation with hydrogen, with the proposed nozzle device 1.

LIST OF REFERENCE SIGNS

1 Nozzle device
1a Nozzle main body
1b Nozzle bracket
2 Fuel line
20 Wall
3 Fuel supply line
4 Port
5 Connecting means
6 Line portion
60 Bore
7 Throttle element
70 Hollow body 7a Individual element 7b Individual element 7c Individual element
8 Line portion
80 Bore
9 Line portion
90 Bore
10 Line portion
100 Bore
11 Relaxation chamber
12 Relaxation chamber
13 Annular seal
14 Fuel
Recess
Dm Diameter of manifold fuel line
Ds Diameter of fuel line
Do Diameter of line portion
Do1 Diameter of line portion
Do2 Diameter of line portion
Do3 Diameter of line portion
M Central longitudinal axis
M1 Central longitudinal axis
M2 Central longitudinal axis
M3 Central longitudinal axis
S1 Stage
S2 Stage
S3 Stage
α1 Angle
α2 Angle
α3 Angle

The invention claimed is:

1. A nozzle device for feeding gaseous fuel into a combustion chamber of a gas turbine assembly, comprising:
   a nozzle main body having nozzle openings for injecting the gaseous fuel into the combustion chamber;
   a nozzle bracket including a fuel line for the fluidic connection between a manifold fuel line of a gaseous fuel manifold and the nozzle main body, wherein the fuel line at least in portions is aligned along, to be symmetrical to, a central longitudinal axis of the nozzle bracket; and
   a throttle element, which is disposed downstream of the manifold fuel line, on an the upstream end of the fuel line, for throttling a fuel flow to a pre-specified target quantity,
   wherein the throttle element comprises:
      at least two stages which are fluidically disposed in series, wherein each of the two stages includes a line portion which is aligned along a respective line portion longitudinal axis and has a flow cross section, wherein each line portion has a single entrance and a single exit, wherein the respective line portion longitudinal axes of the respective line portions of the at least two stages are radially offset from one another, and
      a relaxation chamber disposed between the at least two stages, a flow cross section of said relaxation chamber being larger than the flow cross section of the one of the two stages disposed upstream of the relaxation chamber, wherein an open space of the relaxation chamber at least partially overlaps the central longitudinal axis of the nozzle bracket.

2. The nozzle device according to claim 1, wherein at least one of the line portions within the throttle element has a smaller flow cross section than the manifold fuel line and/or the fuel line downstream of the throttle element.

3. The nozzle device according to claim 1, wherein the line portion has a circular flow cross section with a diameter, wherein a first stage of the at least two stages, disposed farthest upstream, has a flow cross section larger than others of the at least two stages.

4. The nozzle device according to claim 1, wherein any of the at least two stages fluidically disposed downstream of one of the at least two stages has a same or a smaller flow cross section than the one of the at least two stages.

5. The nozzle device according to claim 1, wherein the respective line portions are disposed to be at least in part mutually coaxial and/or coaxial with the central longitudinal axis.

6. The nozzle device according to claim 1, wherein the line portion longitudinal axis of at least one of the at least two stages is radially offset from the central longitudinal axis downstream of the throttle element.

7. The nozzle device according to claim 6, wherein the radial offset is disposed such that the line portion longitudinal axes are mutually offset by between 90° and 270° in a revolving direction.

8. The nozzle device according to claim 6, wherein the radial offset is configured such that the flow cross sections of the line portions of at least two successive stages in terms of the radial position thereof and/or the position thereof in the revolving direction, have a small overlap, of at most 20% of the flow cross section, or no overlap.

9. The nozzle device according to claim 1, wherein the line portion longitudinal axis of at least one of the at least two stages is disposed so as to be inclined at an angle in relation to the line portion longitudinal axis of another of the at least two stages and/or to the central longitudinal axis downstream of the throttle element.

10. The nozzle device according to claim 9, wherein a plurality of line portion longitudinal axes disposed in succession are disposed to be inclined at the angle in relation to the central longitudinal axis downstream of the throttle element, wherein the respective inclinations alternate in a revolving direction.

11. The nozzle device according to claim 1, wherein the throttle element comprises a cylindrical, monolithic, hollow body, the hollow body being fastened to or in the nozzle bracket while being sealed in a fluid-tight manner.

12. The nozzle device according to claim 1, wherein the throttle element, comprises at least two individual elements or is formed therefrom, wherein each of the two individual elements comprises the line portion of one of the at least two stages.

13. The nozzle device according to claim 1, and further comprising a plurality of the relaxation chambers, wherein the respective flow cross sections thereof, are of identical configuration.

14. The nozzle device according to claim 13, wherein the respective flow cross sections of the relaxation chambers correspond to the flow cross section of the fuel line disposed downstream of the throttle element.

15. A gas turbine assembly having a turbine assembly having at least one of the nozzle device according to claim 1.

16. The nozzle device according to claim 1, wherein the relaxation chamber has a relaxation chamber longitudinal axis that is coaxial with the central longitudinal axis.

17. The nozzle device according to claim 16, wherein an axial length of at least one of the line portions is smaller than a diameter of the at least one of the line portions.

18. The nozzle device according to claim 1, wherein an axial length of at least one of the line portions is smaller than a diameter of the at least one of the line portions.

19. The nozzle device according to claim 1, wherein the respective line portion longitudinal axes of the respective line portions of the at least two stages are parallel to one another.

20. The nozzle device according to claim 1, wherein the line portion longitudinal axis of both of the at least two stages are radially offset from the central longitudinal axis downstream of the throttle element.

* * * * *